United States Patent
Choudhury et al.

(10) Patent No.: US 12,445,042 B2
(45) Date of Patent: Oct. 14, 2025

(54) CIRCUIT AND SYSTEM FOR THE PROTECTION OF PRIMARY TRANSISTORS IN POWER CONVERTERS WITH ACTIVE CLAMPING

(71) Applicant: TEXAS INSTRUMENTS INCORPORATED, Dallas, TX (US)

(72) Inventors: Shamim Choudhury, Katy, TX (US); Sheng-Yang Yu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 216 days.

(21) Appl. No.: 18/167,319

(22) Filed: Feb. 10, 2023

(65) Prior Publication Data

US 2024/0275267 A1 Aug. 15, 2024

(51) Int. Cl.
- *H02M 1/32* (2007.01)
- *H02M 1/00* (2006.01)
- *H02M 3/335* (2006.01)
- *H03K 17/0812* (2006.01)

(52) U.S. Cl.
CPC ........... *H02M 1/32* (2013.01); *H02M 1/0009* (2021.05); *H02M 3/33573* (2021.05); *H02M 3/33576* (2013.01); *H03K 17/08122* (2013.01)

(58) Field of Classification Search
CPC ............... H02M 1/32; H02M 3/33573; H02M 3/33576; H02M 1/0009; H03K 17/08122
See application file for complete search history.

(56) References Cited

U.S. PATENT DOCUMENTS

| | | | | |
|---|---|---|---|---|
| 9,293,999 B1 * | 3/2016 | Lam | ................... | H02M 3/33592 |
| 10,693,384 B1 * | 6/2020 | Mondal | ............. | H02M 3/33592 |
| 2011/0062782 A1 * | 3/2011 | Coley | ................ | H02M 3/33538 |
| | | | | 363/21.05 |
| 2011/0063760 A1 * | 3/2011 | Coley | ..................... | H02M 1/32 |
| | | | | 323/284 |
| 2011/0299304 A1 | 12/2011 | Coley et al. | | |
| 2018/0301975 A1 * | 10/2018 | Lin | ................... | H02M 3/33569 |
| 2019/0207524 A1 * | 7/2019 | Mnich | ............... | H02M 3/33573 |
| 2022/0255448 A1 | 8/2022 | Zafarana | | |
| 2024/0006982 A1 * | 1/2024 | Dumais | ............. | H02M 3/33571 |

FOREIGN PATENT DOCUMENTS

| | | | |
|---|---|---|---|
| JP | 2017051045 A | 3/2017 | |
| KR | 20010090539 A | 10/2001 | |

OTHER PUBLICATIONS

International Search report for PCT/US2023/086223, dated Apr. 24, 2024.
Machine Translation for JP2017051045A.
Machine Translation for KR20010090539A.

* cited by examiner

*Primary Examiner* — Rafael O De Leon Domenech
(74) *Attorney, Agent, or Firm* — Xianghui Huang; Frank D. Cimino (57) ABSTRACT

An electronic system for controlling a power converter having an active clamping circuit includes a current sensor configured to sense current through a primary side of a transformer within the power converter, and a comparator sub-system. The comparator sub-system is configured to receive a transformer current signal from the current sensor and generate a trip signal based on a difference between the transformer current signal and a reference signal. The electronic system also includes a pulse width modulator configured to generate a gate input signal for the active clamping circuit based at least in part on the trip signal.

20 Claims, 7 Drawing Sheets

CIRCUIT AND SYSTEM FOR THE PROTECTION OF PRIMARY TRANSISTORS IN POWER CONVERTERS WITH ACTIVE CLAMPING

TECHNICAL BACKGROUND

Power modules are used in a large variety of applications including inverters, DC-DC converters, motor drives, power supplies, uninterruptable power supplies (UPS), and the like. Some of these power modules are constructed with power transistors such as Insulated Gate Bipolar Transistors (IGBTs) or Metal-Oxide-Semiconducting Field-Effect Transistors (MOSFETs), configured as phase-shifted full-bridge (PSFB) peak current mode control (PCMC) DC-DC power converters. For higher voltage outputs, such as 54V outputs, active clamping (ACL) circuits may be used in the output stage of the PSFB PCMC DC-DC power module to ensure safe operation of the output stage transistors while maintaining high efficiency. However, many implementations of this active clamping circuit adversely affect the peak current flowing in the PSFB module.

OVERVIEW

In an implementation, an electronic system for controlling a power converter having an active clamping circuit includes a current sensor configured to sense current through a primary side of a transformer within the power converter, and a comparator sub-system.

The comparator sub-system is configured to receive a transformer current signal from the current sensor and generate a trip signal based on a difference between the transformer current signal and a reference signal. The electronic system also includes a pulse width modulator configured to generate a gate input signal for the active clamping circuit based at least in part on the trip signal.

In another implementation, a microcontroller unit for controlling a power converter having an active clamping circuit includes a comparator sub-system configured to receive a transformer current signal from a current sensor and generate a trip signal based on a difference between the transformer current signal and a reference signal.

The microcontroller also includes a pulse width modulator configured to generate a gate input signal for the active clamping circuit based at least in part on the trip signal.

In a further embodiment, a method for using a microcontroller unit to control a power converter having an active clamping circuit includes receiving a transformer current signal from a current sensor.

The method also includes generating a trip signal based on a difference between the transformer current signal and a reference signal, and generating a gate input signal for the active clamping circuit based at least in part on the trip signal.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following descriptions of various example embodiments and implementations of an electronic system for controlling a PSFB PCMC power converter with active clamping illustrate systems and methods for protecting primary transistors within power converters. In these various examples, a pulse width modulator is configured to provide a gate input to an active clamping circuit within a power converter. The active clamping circuit limits the voltage across the secondary bridge within the phase-shifted full-bridge power converter, but distorts the peak current within the transformer. In some examples, a microcontroller unit is configured to control the primary transistors within the power converter along with the active clamping circuit.

By varying the pulse width of the signal controlling the active clamping circuit, the electronic system minimizes effects of the active clamping circuit on the output current of the power converter, providing a technical effect and technical advantage over current solutions. The electronic system controls the active clamping circuit such that it turns on only during an early part of the cycle, providing effective clamping when it is needed the most. Active clamping is turned off during a latter part of the cycle, eliminating distortion in the peak current within the transformer, and helping to retain the linear ramp wave shape towards the latter part of the waveform for effective peak current mode control. Active clamping provides higher efficiency compared to passive clamping.

The electronic system senses the current of the power converter on the primary side of the transformer, and by comparing this current to a reference current, provides the ability to continuously adjust control of the active clamping circuit, allowing for high efficiency clamping and effective peak current mode control under varying load conditions. By sensing current on the primary side of the transformer, the active clamping circuit is controlled to provide protection of transistors on the primary side of the power converter while maintaining high efficiency active clamping at the output.

Figure 1:
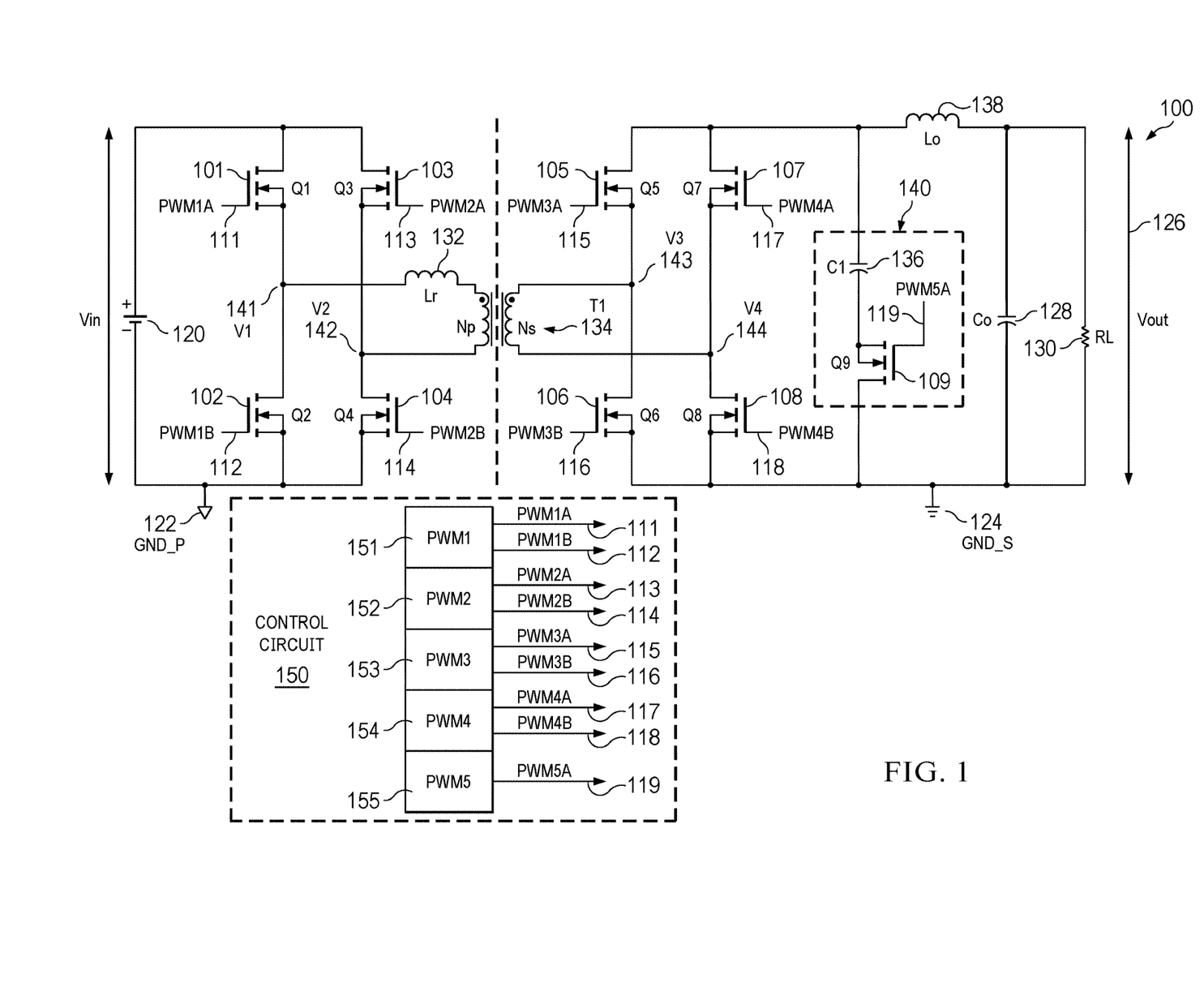
FIG. 1 illustrates an example embodiment of a phase-shifted full-bridge power converter including an active clamping circuit.

FIG. 1 illustrates an example embodiment of a phase-shifted full-bridge power converter 100 including an active clamping circuit 140. In this embodiment, full-bridge rectifiers are provided on both the primary and secondary sides of transformer T1 134, which has Np primary winding turns and Ns secondary winding turns.

The primary side full-bridge rectifier includes primary transistors Q1 101, Q2 102, Q3 103, and Q4 104. In this example embodiment, these primary transistors are MOS- FETs, however other embodiments may use other types of transistors, such as IGBTs, and the like. The gate of transistor Q1 101 is driven by signal $PWM_{1A}$ 111; the gate of transistor Q2 102 is driven by signal $PWM_{1B}$ 112; the gate of transistor Q3 103 is driven by signal $PWM_{2A}$ 113; and the gate of transistor Q4 104 is driven by signal $PWM_{2B}$ 114. The primary side rectifier is powered by Vin 120 and is grounded at GND_P 122. Node 141 is labeled as voltage V1, and node 142 is labeled as voltage V2. The primary side also includes inductor Lr 132.

The secondary side full-bridge rectifier includes primary transistors Q5 105, Q6 106, Q7 107, and Q8 108. In this example embodiment, these primary transistors are MOSFETs, however other embodiments may use other types of transistors, such as IGBTs, and the like. The gate of transistor Q5 105 is driven by signal $PWM_{3A}$ 115; the gate of transistor Q6 106 is driven by signal $PWM_{3B}$ 116; the gate of transistor Q7 107 is driven by signal $PWM_{4A}$ 117; and the gate of transistor Q8 108 is driven by signal $PWM_{4B}$ 118. The secondary side rectifier produces output voltage Vout 126 across resistive load RL 130 and capacitive load Co 128, and is grounded at GND_S 124. Node 143 is labeled as voltage V3, and node 144 is labeled as voltage V4. The secondary side also includes inductor Lo 138.

The secondary side also includes active clamping circuit 140. In this example embodiment, active clamping circuit 140 includes capacitor C1 136 in series with transistor Q9 109 across the output of the secondary side full-bridge rectifier. The gate of transistor Q9 109 is controlled by signal $PWM_{5A}$ 119 in order to provide active clamping of the output in order to ensure safe operation of the output stage transistors while maintaining high efficiency. By controlling signal $PWM_{5A}$ 119, the circuits and systems described below minimize effects of the active clamping circuit on the output current of the power converter.

Control signals $PWM_{1A}$ 111, $PWM_{1B}$ 112, $PWM_{2A}$ 113, $PWM_{2B}$ 114, $PWM_{3A}$ 115, $PWM_{3B}$ 116, $PWM_{4A}$ 117, $PWM_{4B}$ 118, and $PWM_{5A}$ 119 are produced by pulse width modulators PWM1 151, PWM2 152, PWM3 153, PWM4 154, and PWM5 155 within control circuit 150.

Pulse width modulator modules PWM1 151, PWM2 152, PWM3 153, and PWM4 154 are configured to generate signals controlling the primary transistors 101-108 of the phase-shifted full-bridge power converter 100. Pulse width modulator module PWM1 151 is configured to generate signals $PWM_{1A}$ 111 and $PWM_{1B}$ 112. Pulse width modulator module PWM2 152 is configured to generate signals $PWM_{2A}$ 113 and $PWM_{2B}$ 114. Pulse width modulator module PWM3 153 is configured to generate signals $PWM_{3A}$ 115 and $PWM_{3B}$ 116. Pulse width modulator module PWM4 154 is configured to generate signals $PWM_{4A}$ 117 and $PWM_{4B}$ 118. Pulse width modulator module PWM5 155 is configured to generate signal $PWM_{5A}$ 119, which controls active clamping circuit 140.

Figure 2:
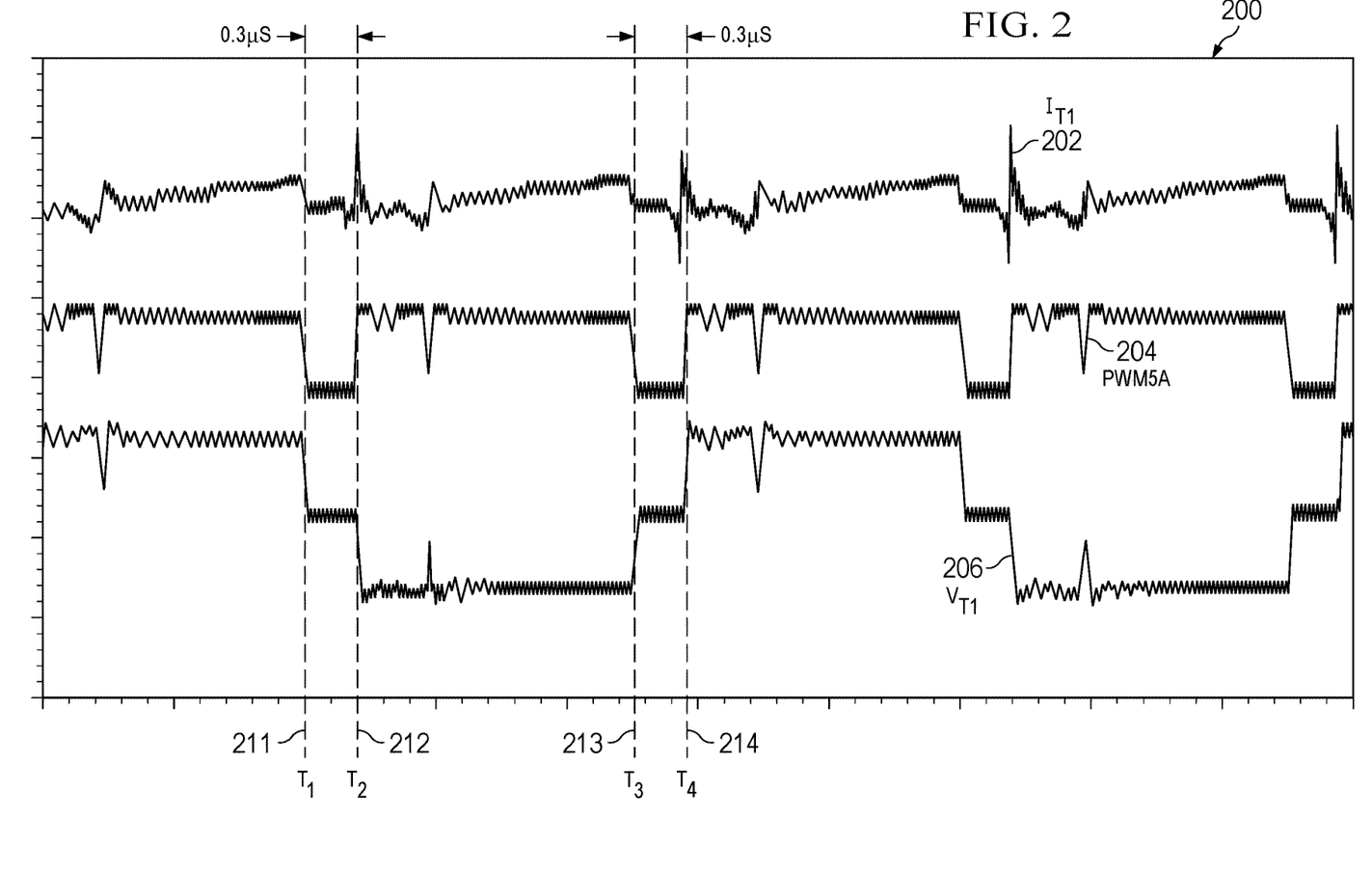
FIG. 2 illustrates an output of a simulation of a phase-shifted full-bridge power converter including an active clamping circuit.

FIG. 2 illustrates an output 200 of a simulation of a phase-shifted full-bridge power converter 100 including an active clamping circuit 140. This example simulation illustrates the waveforms of several nodes within the phase-shifted full-bridge power converter 100 of FIG. 1 during operation of active clamping circuit 140. Here, the current through the primary side of transformer T1 134 ($I_{T1}$ 202), signal $PWM_{5A}$ 204, and the voltage across the primary side of transformer T1 124 ($V_{T1}$ 206) of the phase-shifted full-bridge PCMC are illustrated.

$PWM_{5A}$ 204 is generated by the MCU for the purpose of controlling the ACL MOSFET Q9 109. The active clamping MOSFET Q9 109 is off between the time intervals $T_1$ 211 to $T_2$ 212 and between $T_3$ 213 and $T_4$ 214 when the $PWM_{5A}$ 204 signal is low. The active clamping MOSFET Q9 109 is on immediately before $T_1$ 211, between the time intervals $T_2$ 212 to $T_3$ 213, and immediately after $T_4$ 214 when the $PWM_{5A}$ 204 signal is high. Larger active clamping duty cycles result in higher RMS currents within the transformer windings.

The voltage across the primary side of transformer T1 124 ($V_{T1}$ 206), being an alternating current (AC) signal, is positive high immediately before $T_1$ 211 and immediately after $T_4$ 214 and negative high between times $T_2$ 212 and $T_3$ 213. This is due to the action of the four primary MOSFETs Q1-Q4 101-104 in order to transfer power from the primary side of transformer T1 124 to the secondary side of transformer T1 124.

$V_{T1}$ 206 is zero between times $T_1$ 211 to $T_2$ 212 and between times $T_3$ 213 and $T_4$ 214, so no power is transferred from the primary side to the secondary side of transformer T1 124 during these two intervals of time. $V_{T1}$ 206 is high immediately before $T_1$ 211, between times $T_2$ 212 to $T_3$ 213, and immediately after $T_4$ 214 so power is transferred from the primary side to the secondary side of transformer T1 124 during these two intervals of time.

During the time intervals when power is transferred from the primary side to the secondary side of transformer T1 124 the active clamping MOSFET Q9 109 remains on and clamps any voltage spike across the primary side and the secondary side of transformer T1 124. This clamping action limits the voltage across the four secondary MOSFETs Q5-Q8 105-108, and helps provide the needed protection for the secondary MOSFETs Q5-Q8 105-108.

During the power transfer time intervals (immediately before $T_1$ 211, between $T_2$ 212 to $T_3$ 213, and immediately after $T_4$ 214) the current through the primary side of transformer T1 134 ($I_{T1}$ 202) gradually builds up, indicating power transfer from the primary side to the secondary side of transformer T1 124. The current through the primary side of transformer T1 134 ($I_{T1}$ 202) drops to zero between times $T_1$ 211 to $T_2$ 212 and between times $T_3$ 213 and $T_4$ 214 indicating that no power is transferred to the secondary side of transformer T1 124.

In this example, the interval between times $T_1$ 211 and $T_2$ 212 and between times $T_3$ 213 and $T_4$ 214 when the active clamping MOSFET Q9 109 is off, is 0.3 uS during each cycle of the output of power converter 100.

Figure 3:
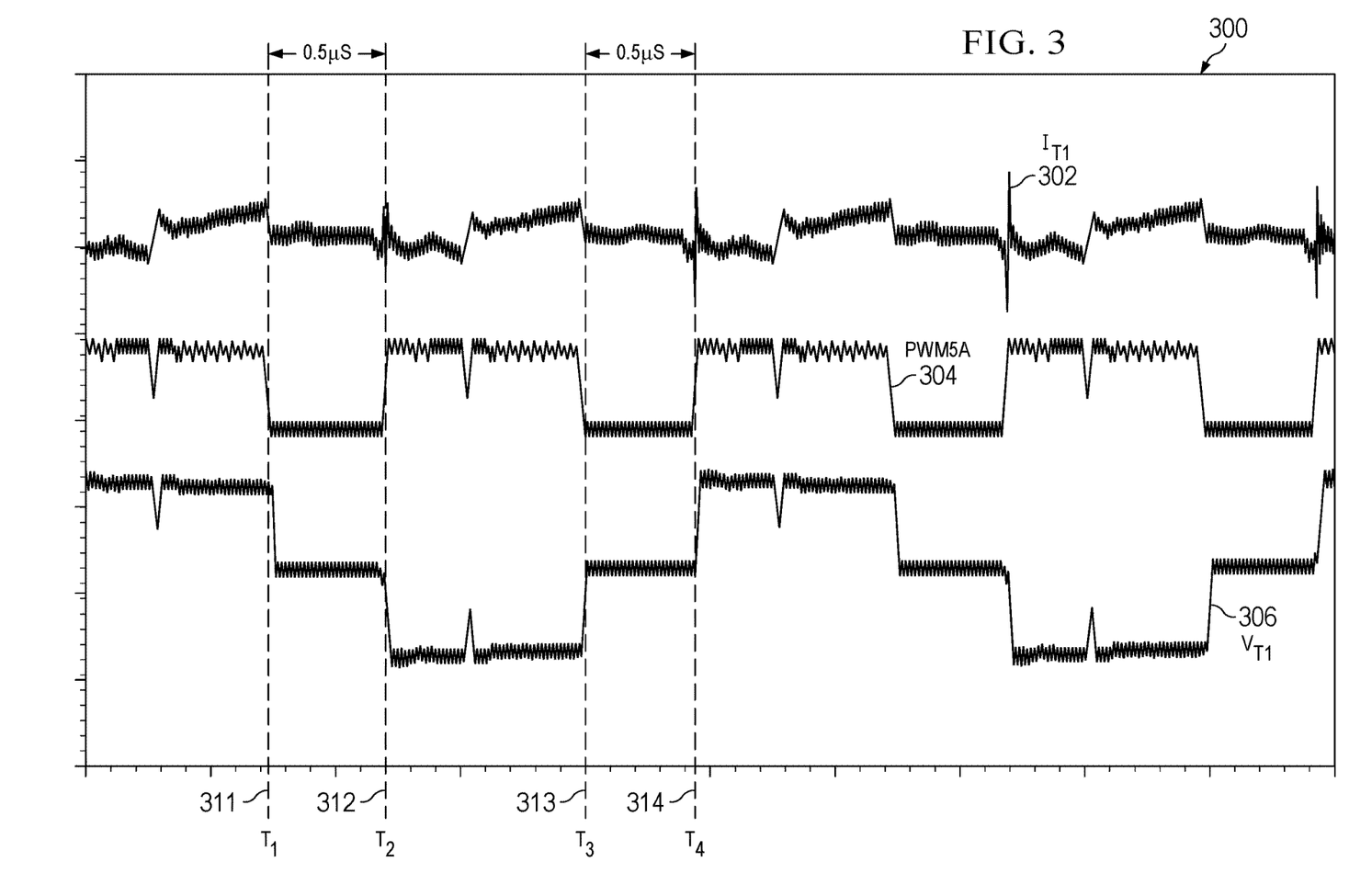
FIG. 3 illustrates an output of a simulation of a phase-shifted full-bridge power converter including an active clamping circuit.

FIG. 3 illustrates an output 300 of a simulation of a phase-shifted full-bridge power converter 100 including an active clamping circuit 140. This example simulation illustrates the same waveforms as in FIG. 2, but with a different duty cycle for the active clamping pulse width modulator. Here, the current through the primary side of transformer T1 134 ($I_{T1}$ 302), signal $PWM_{5A}$ 304, and the voltage across the primary side of transformer T1 124 ($V_{T1}$ 306) are illustrated.

$PWM_{5A}$ 304 is generated by the MCU for the purpose of controlling the ACL MOSFET Q9 109. The active clamping MOSFET Q9 109 is off between the time intervals $T_1$ 311 to $T_2$ 312 and between $T_3$ 313 and $T_4$ 314 when the $PWM_{5A}$ 304 signal is low. The active clamping MOSFET Q9 109 is on immediately before $T_1$ 311, between the time intervals $T_2$ 312 to $T_3$ 313, and immediately after $T_4$ 314 when the $PWM_{5A}$ 304 signal is high. Larger active clamping duty cycles result in higher RMS currents within the transformer windings.

In this example, the interval between times $T_1$ 311 and $T_2$ 312 and between times $T_3$ 313 and $T_4$ 314 when the active clamping MOSFET Q9 109 is off, is 0.5 uS during each cycle of the output of power converter 100, thus the circuit of FIG. 3 has a lower duty cycle than the circuit of FIG. 2, resulting in lower RMS currents within the transformer windings.

By controlling the duty cycle of signal $PWM_{5A}$ 204 and 304, the circuits and systems described below minimize effects of the active clamping circuit on the RMS currents within the transformer windings of power converter 100.

Figure 4:
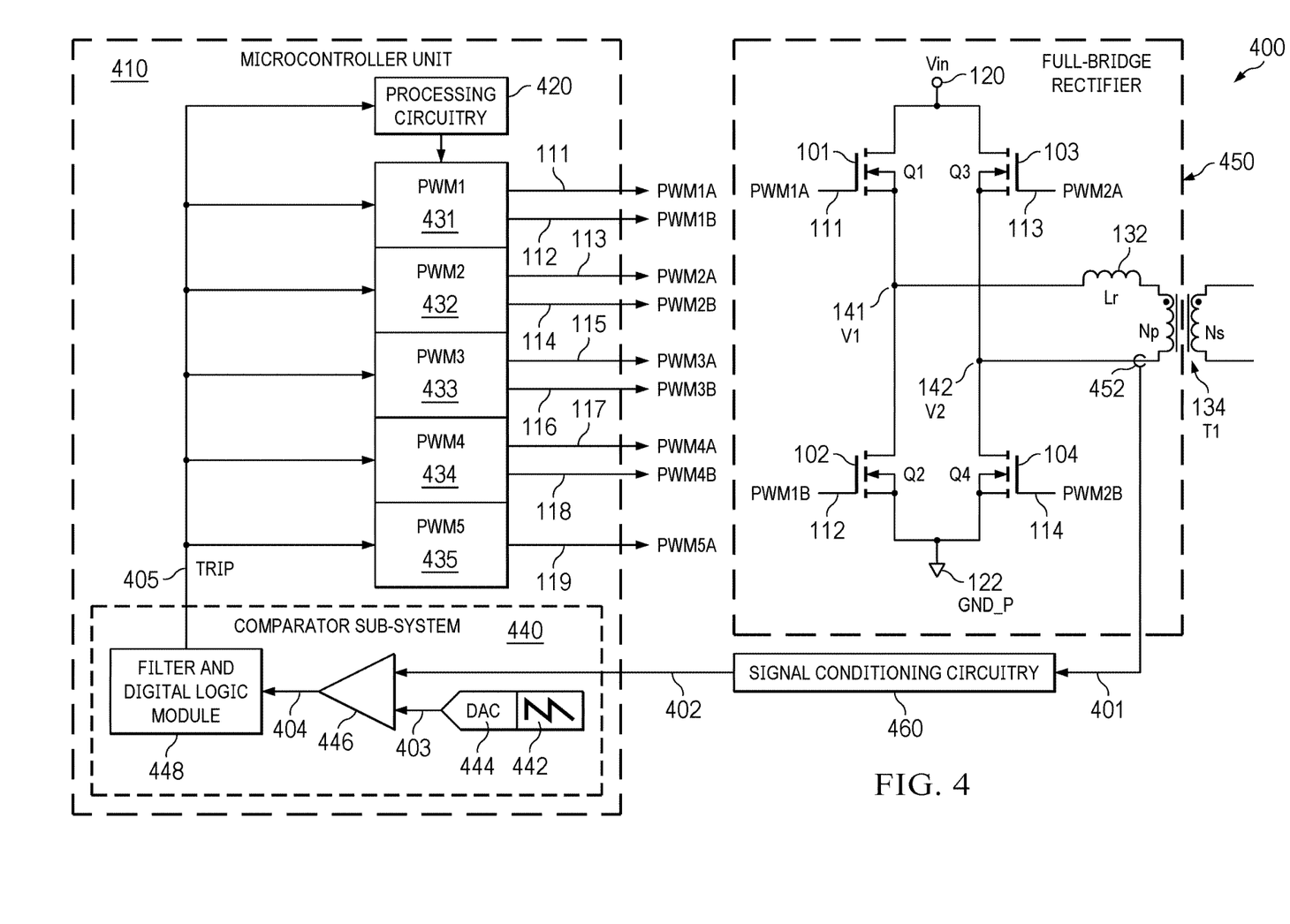
FIG. 4 illustrates an example embodiment of an electronic system designed to control a power converter including an active clamping circuit.

FIG. 4 illustrates an example embodiment of an electronic system 400 designed to control a power converter 100 including an active clamping circuit 140. In this example embodiment, the primary side full-bridge rectifier 450 from the phase-shifted full-bridge power converter 100 of FIG. 1 is illustrated along with an electronic system 400 configured to control active clamping circuit 140 and the primary transistors of the phase-shifted full-bridge power converter 100 of FIG. 1

In this example, the primary side full-bridge rectifier 450 includes primary transistors Q1 101, Q2 102, Q3 103, and Q4 104. The gate of transistor Q1 101 is driven by signal $PWM_{1A}$ 111; the gate of transistor Q2 102 is driven by signal $PWM_{1B}$ 112; the gate of transistor Q3 103 is driven by signal $PWM_{2A}$ 113; and the gate of transistor Q4 104 is driven by signal $PWM_{2B}$ 114. The primary side rectifier is powered by Vin 120 and is grounded at GND_P 122. The primary side also includes inductor Lr 132.

In this example, current sensor 452 is configured to sense the current through the primary side of transformer T1 135. Signal conditioning circuitry 460 is configured to generate a transformer current signal 402 based on the current 401 through the primary side of the transformer T1 135 within the power converter 100.

In this example embodiment, microcontroller unit 410 is configured to generate a plurality of signals used to control both the primary transistors 101-108 and the active clamping circuit 140 of the phase-shifted full-bridge power converter 100 of FIG. 1. Microcontroller unit 410 includes processing circuitry 420, pulse width modulator modules PWM1 431, PWM2 432, PWM3 433, PWM4 434, and PWM5 435, along with comparator sub-system 440.

Pulse width modulator modules PWM1 431, PWM2 432, PWM3 433, and PWM4 434 are configured to generate signals controlling the primary transistors 101-108 of the phase-shifted full-bridge power converter 100 of FIG. 1. Pulse width modulator module PWM1 431 is configured to generate signals $PWM_{1A}$ 111 and $PWM_{1B}$ 112. Pulse width modulator module PWM2 432 is configured to generate signals $PWM_{2A}$ 113 and $PWM_{2B}$ 114. Pulse width modulator module PWM3 433 is configured to generate signals $PWM_{3A}$ 115 and $PWM_{3B}$ 116. Pulse width modulator module PWM4 434 is configured to generate signals $PWM_{4A}$ 117 and $PWM_{4B}$ 118. Pulse width modulator module PWM5 435 is configured to generate signal $PWM_{5A}$ 119, which controls active clamping circuit 140. All of the pulse width modulator modules are coupled with, and controlled by processing circuitry 420.

Comparator sub-system 440 includes digital-to-analog converter (DAC) 444, ramp input 442, comparator 446 and filter and digital logic module 448. Comparator sub-system 440 receives transformer current signal 402 based on the current 401 through the primary side of the transformer T1 135 within the power converter 100. Comparator 446 compares the transformer current signal 402 to a reference signal 403 generated by DAC 444. Ramp input 442 is configured to provide digital slope compensation to DAC 444.

Comparator 446 generates comparator output signal 404 based on a difference between transformer current signal 402 and reference signal 403. Filter and digital logic module 448 receives comparator output signal 404 from comparator 446 and generates the trip signal 405 based on the comparator output signal 404. The trip signal 405 is provided to the pulse width modulator modules 431-435 and processing circuitry 420. Processing circuitry 420 is configured to control pulse width modulator module PWM5 435 to produce signal $PWM_{5A}$ 119 having a pulse width based at least in part on the trip signal 405 in order to control active clamping circuit 140 in a manner to clamp the output voltage of power converter 100 while ensuring safe operation of the output stage transistors, and while minimizing the effects of the active clamping circuit 140 on the output current of power converter 100.

Figure 5:
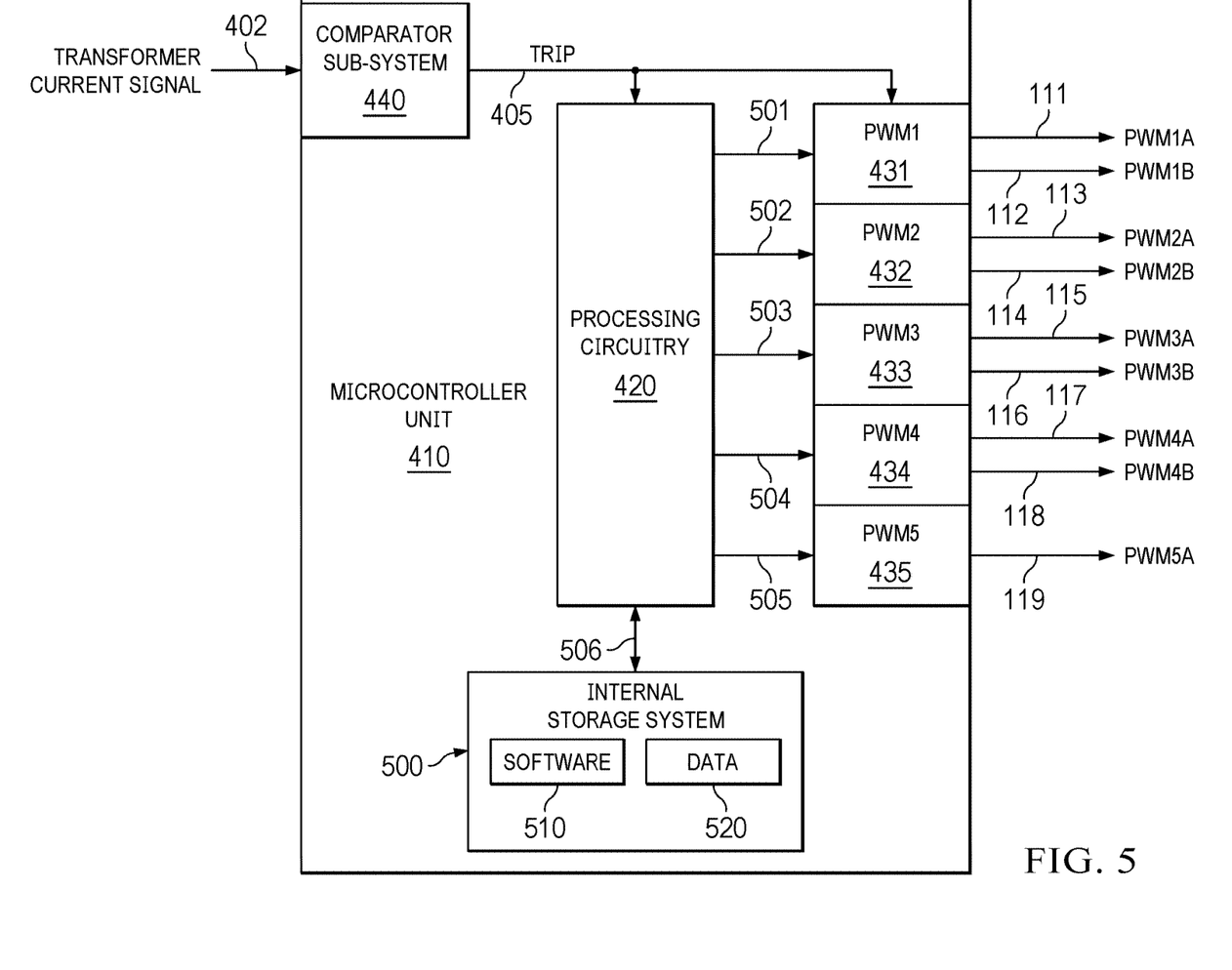
FIG. 5 illustrates a block diagram of an example embodiment of a microcontroller unit configured to control a power converter including an active clamping circuit.

FIG. 5 illustrates a block diagram of an example embodiment of a microcontroller unit 410 configured to control a power converter 100 including an active clamping circuit 140. As discussed above, microcontroller unit 410 may take on any of a wide variety of configurations. Here, a simplified example configuration is provided for microcontroller unit 410 of FIG. 4.

In this example embodiment, microcontroller unit 410 comprises comparator sub-system 440, processing circuitry 420, pulse width modulator modules PWM1 431, PWM2 432, PWM3 433, PWM4 434, and PWM5 435, and internal storage system 500. Pulse width modulator modules PWM1 431, PWM2 432, PWM3 433, and PWM4 434 are configured to generate signals controlling the primary transistors 101-108 of the phase-shifted full-bridge power converter 100 of FIG. 1. Pulse width modulator module PWM1 431 is configured to generate signals $PWM_{1A}$ 111 and $PWM_{1B}$ 112. Pulse width modulator module PWM2 432 is configured to generate signals $PWM_{2A}$ 113 and $PWM_{2B}$ 114. Pulse width modulator module PWM3 433 is configured to generate signals $PWM_{3A}$ 115 and $PWM_{3B}$ 116. Pulse width modulator module PWM4 434 is configured to generate signals $PWM_{4A}$ 117 and $PWM_{4B}$ 118. Pulse width modulator module PWM5 435 is configured to generate signal $PWM_{5A}$ 119, which controls active clamping circuit 140. All of the pulse width modulator modules are coupled with, and controlled by processing circuitry 420 through links 501, 502, 503, 504, and 505.

Comparator sub-system 440 is configured to generate and provide trip signal 504 to processing circuitry 420 and the pulse width modulator modules 431-435 as described above with respect to FIG. 4.

Processing circuitry 420 comprises electronic circuitry configured to direct microcontroller unit 410 to control a power converter 100 having an active clamping circuit 140 as described above. Processing circuitry 420 may comprise microprocessors and other circuitry that retrieves and executes software 510. Examples of processing circuitry 420 include general purpose central processing units, application specific processors, and logic devices, as well as any other type of processing device, combinations, or variations thereof. Processing circuitry 420 can be implemented within a single processing device but can also be distributed across multiple processing devices or sub-systems that cooperate in executing program instructions.

Internal storage system 500 can comprise any non-transitory computer readable storage media capable of storing software 510 that is executable by processing circuitry 420. Internal storage system 500 can also include various data structures 520 which comprise one or more registers, databases, tables, lists, or other data structures. Storage system 500 can include volatile and nonvolatile, removable and non-removable media implemented in any method or technology for storage of information, such as computer readable instructions, data structures, program modules, or other data.

Storage system 500 can be implemented as a single storage device but can also be implemented across multiple storage devices or sub-systems co-located or distributed relative to each other. Storage system 500 can comprise additional elements, such as a controller, capable of communicating with processing circuitry 420. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 510 can be implemented in program instructions and among other functions can, when executed by microcontroller unit 410 in general or processing circuitry 420 in particular, direct microcontroller unit 410, or processing circuitry 420, to operate as described herein to control a power converter 100 having an active clamping circuit 140. Software 510 can include additional processes, programs, or components, such as operating system software, database software, or application software. Software 510 can also comprise firmware or some other form of machine-readable processing instructions executable by elements of processing circuitry 420.

In at least one example implementation, the program instructions include various modules configured to direct processing circuitry 420 to control pulse width modulator modules PWM1 431, PWM2 432, PWM3 433, and PWM4 434 to generate signals controlling the primary transistors 101-108 of the phase-shifted full-bridge power converter 100 of FIG. 1. The program instructions also include modules configured to direct processing circuitry 420 to control pulse width modulator module PWM5 435 to generate signal $PWM_{5A}$ 119, which controls active clamping circuit 140.

In general, software 510 can, when loaded into processing circuitry 420 and executed, transform processing circuitry 420 overall from a general-purpose computing system into a special-purpose computing system customized to operate as described herein for a microcontroller unit 410 configured to control a power converter 100 including an active clamping circuit 140, among other operations. Encoding software 510 on internal storage system 500 can transform the physical structure of internal storage system 500. The specific transformation of the physical structure can depend on various factors in different implementations of this description. Examples of such factors can include, but are not limited to the technology used to implement the storage media of internal storage system 500 and whether the computer-storage media are characterized as primary or secondary storage.

For example, if the computer-storage media are implemented as semiconductor-based memory, software 510 can transform the physical state of the semiconductor memory when the program is encoded therein. For example, software 510 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 6:
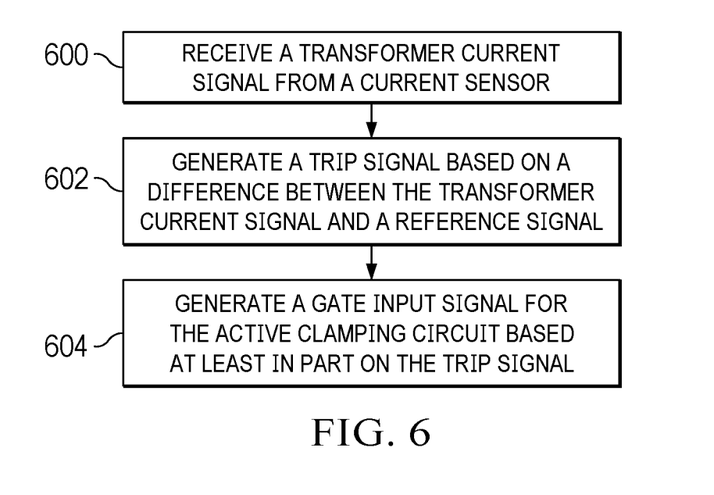
FIG. 6 illustrates a flow chart of an example embodiment of a method for using a microcontroller unit to control a power converter including an active clamping circuit.

FIG. 6 illustrates a flow chart of an example embodiment of a method for using a microcontroller unit 410 to control a power converter 100 including an active clamping circuit 140.

In this example method, microcontroller unit 410 receives a transformer current signal 402 from a current sensor 452, (operation 600). Comparator sub-system 440 generates a trip signal 405 based on a difference between the transformer current signal 402 and a reference signal 403, (operation 602).

Microcontroller unit 410 then generates a gate input signal $PWM_{5A}$ 119 for the active clamping circuit 140 based at least in part on the trip signal 405, (operation 604).

Figure 7:
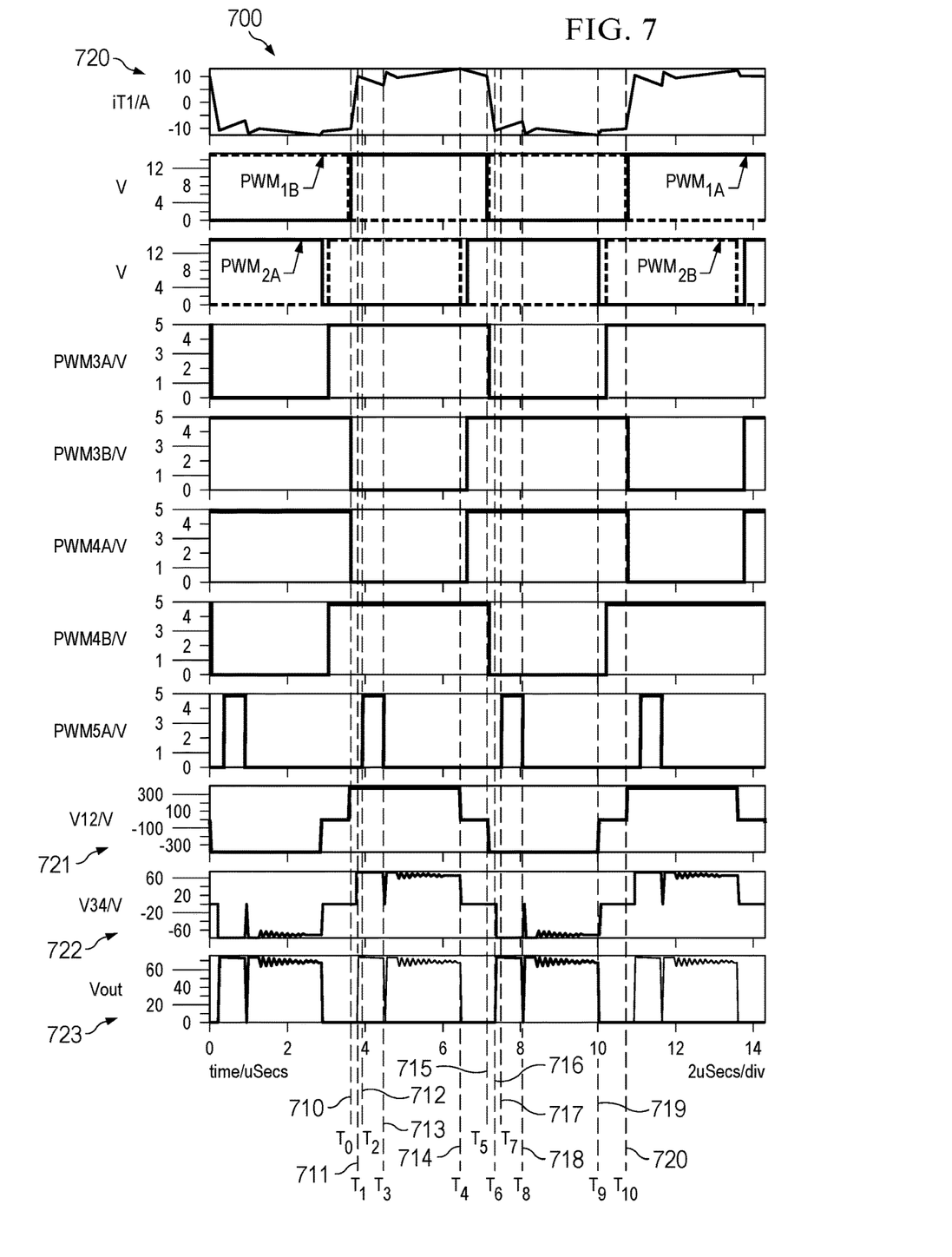
FIG. 7 illustrates operation of a phase-shifted full-bridge power converter including an active clamping circuit.

FIG. 7 illustrates a timing diagram 700 of a phase-shifted full-bridge power converter 100 including an active clamping circuit 140. In particular, the timing diagram 700 illustrates the control signals provided by the control circuit 150 and the resulting behavior of the power converter 100. Aspects of the operation shown in FIG. 7 may be substantially similar to those described in FIG. 2 and FIG. 3.

Immediately before time $T_0$ 710, the signal $PWM_{1A}$ 111 is de-asserted, causing transistor Q1 101 to be in an off (e.g., cutoff) state, and the signal $PWM_{1B}$ 112 is asserted, causing transistor Q2 102 to be in an on (e.g., saturated) state. Similarly, the signal $PWM_{2A}$ 113 is de-asserted, causing transistor Q3 103 to be in an off state, and the signal $PWM_{2B}$ 114 is asserted, causing transistor Q4 104 to be in the on state. This time immediately before $T_0$ 110 may be considered a guardband time when, to prevent current flow through, the inductor Lr 132 and the transformer T1 134 are only connected to ground.

Immediately before time $T_0$ 710, signal $PWM_{5A}$ 119 is de-asserted, causing transistor Q9 109 to be in the off state.

At time $T_0$ 710, the signal $PWM_{1A}$ 111 transitions to being asserted, causing transistor Q1 101 to transition to the on state, and the signal $PWM_{1B}$ 112 transitions to being de-asserted, causing transistor Q2 102 to transition to the off state. The signal $PWM_{2A}$ 113 remains de-asserted, and the signal $PWM_{2B}$ 114 remains asserted.

The signal $PWM_{3A}$ 115 remains asserted, causing transistor Q5 105 to be in the on state, and the signal $PWM_{3B}$ 116 transitions to being de-asserted, causing transistor Q6 106 to transition to the off state. The signal $PWM_{4A}$ 117 transitions to being de-asserted, causing transistor Q7 107 to transition to the off state, and the signal $PWM_{4B}$ 118 remains asserted, causing transistor Q8 108 to be in the on state.

The signal $PWM_{5A}$ 119 remains de-asserted, causing transistor Q9 109 to be in the off state.

As a result, the voltage between nodes V1 141 and V2 142 (illustrated as $V_{12}$ 721) rises to or near Vin while the voltage between nodes V3 143 and V4 144 (illustrated as $V_{34}$ 722) remains at or near zero. Hence, current through inductor Lr 132 (illustrated as $iT_1$ 720) begins to rise and change direction. As the voltage $V_{34}$ 722 is still zero between $T_0$ 710 and $T_1$ 711, it may not be desirable to turn on Q9 109 (controlled by $PWM_{5A}$) to avoid the ACL capacitor 136 energy being discharged to the secondary winding.

At time $T_1$ 711, the current $iT_1$ 720 has reached its peak, and voltages $V_{12}$ 721 and $V_{34}$ 722 and the output voltage Vout 723 have also reached their peak. The control circuit 150 waits for a selectable delay before transitioning the power converter 100 to the next state at $T_2$ 712.

At time $T_2$ 712, the signal $PWM_{5A}$ 119 is asserted, causing transistor Q9 109 to transition to the on state, thus enabling the active clamping. This active clamping time between times $T_2$ 712 and $T_3$ 713 may be relatively short, and in some examples, the control circuit 150 specifies an active clamping time of approximately 700 ns in a 100 kHz power converter 100.

At time $T_3$ 713, the signal $PWM_{5A}$ 119 is de-asserted, causing transistor Q9 109 to transition to the off state, thus ending the active clamping time.

At time $T_4$ 714, the signal $PWM_{1A}$ 111 remains asserted, causing transistor Q1 101 to remain in the on state, and the signal $PWM_{1B}$ 112 remains de-asserted, causing transistor Q2 102 to remain in the off state. The signal $PWM_{2A}$ 113 remains de-asserted, causing transistor Q3 103 to remain in the off state, and the signal $PWM_{2B}$ 114 transitions to being de-asserted, causing transistor Q4 104 to transition to the off state.

The signal $PWM_{3A}$ 115 remains asserted, causing transistor Q5 105 to be in the on state, and the signal $PWM_{3B}$ 116 remains de-asserted, causing transistor Q6 106 to be in the off state. The signal $PWM_{4A}$ 117 remains de-asserted, causing transistor Q7 107 to be in the off state, and the signal $PWM_{4B}$ 118 remains asserted, causing transistor Q8 108 to be in the on state.

The signal $PWM_{5A}$ 119 remains de-asserted, causing transistor Q9 109 to be in the off state.

As a result, voltages $V_{12}$ 721 and $V_{34}$ 722 begin to fall to zero.

At time $T_5$ 715, the signal $PWM_{1A}$ 111 transitions to being de-asserted, causing transistor Q1 101 to transition to the off state, and the signal $PWM_{1B}$ 112 transitions to being asserted, causing transistor Q2 102 to transition to the on state. The signal $PWM_{2A}$ 113 transitions from being de-asserted to being asserted between time $T_4$ 714 and $T_5$ 715, and is asserted at time $T_5$ 715, causing transistor Q3 103 to be in the on state. The signal $PWM_{2B}$ 114 remains de-asserted, causing transistor Q4 104 to be in the off state.

The signal $PWM_{3A}$ 115 transitions from being asserted to being de-asserted at time $T_5$ 715 or shortly thereafter, causing transistor Q5 105 to be in the off state. The signal $PWM_{3B}$ 116 transitions from being de-asserted to being asserted between time $T_4$ 714 and $T_5$ 715, and is asserted at time $T_5$ 715, causing transistor Q6 106 to be in the on state. The signal $PWM_{4A}$ 117 also transitions from being de-asserted to being asserted between time $T_4$ 714 and $T_5$ 715, and is asserted at time $T_5$ 715, causing transistor Q7 107 to be in the on state. The signal $PWM_{4B}$ 118 transitions from being asserted to being de-asserted at time $T_5$ 715 or shortly thereafter, causing transistor Q8 108 to be in the off state.

The signal $PWM_{5A}$ 119 remains de-asserted, causing transistor Q9 109 to be in the off state.

As a result, the voltage $V_{12}$ 721 rises to or near negative Vin while the voltage $V_{34}$ 722 remains at or near zero. Hence, current $iT_1$ 720 begins to fall and change direction.

At time $T_6$ 716, the current $iT_1$ 720 has reached its peak, and voltages $V_{12}$ 721 and $V_{34}$ 722 have also reached their peak, albeit in an opposite polarity from the peaks at time $T_1$ 711. The output voltage Vout 723 has also reached a peak. The control circuit 150 waits for a selectable delay before transitioning the power converter 100 to the next state at $T_7$ 717. This delay may be the same or different from the delay between times $T_1$ 711 and $T_2$ 712.

At time $T_7$ 717, the signal $PWM_{5A}$ 119 is asserted, causing transistor Q9 109 to transition to the on state, thus enabling the active clamping. This active clamping time between times $T_7$ 717 and $T_8$ 718 may be the same or different from the active clamping time between times $T_2$ 712 and $T_3$ 713.

At time $T_8$ 718, the signal $PWM_{5A}$ 119 is de-asserted, causing transistor Q9 109 to transition to the off state, thus ending the active clamping time.

At time $T_9$ 719, the signal $PWM_{1A}$ 111 remains de-asserted, causing transistor Q1 101 to remain in the off state, and the signal $PWM_{1B}$ 112 remains asserted, causing transistor Q2 102 to remain in the on state. The signal $PWM_{2A}$ 113 transitions to being de-asserted, causing transistor Q3 103 to transition to the off state, and the signal $PWM_{2B}$ 114 remains de-asserted, causing transistor Q4 104 to be in the off state.

The signal $PWM_{3A}$ 115 remains de-asserted, causing transistor Q5 105 to be in the off state, and the signal $PWM_{3B}$ 116 remains asserted, causing transistor Q6 106 to be in the on state. The signal $PWM_{4A}$ 117 remains asserted, causing transistor Q7 107 to be in the on state, and the signal $PWM_{4B}$ 118 remains de-asserted, causing transistor Q8 108 to be in the off state.

The signal $PWM_{5A}$ 119 remains de-asserted, causing transistor Q9 109 to be in the off state.

The cycle repeats, and accordingly, the state and behavior of the power converter 100 at time $T_{10}$ 720 may be substantially similar to the state at time $T_0$ 710.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. An electronic system for controlling a power converter having an active clamping circuit, comprising:
   a current sensor configured to sense current through a primary side of a transformer within the power converter;
   a comparator sub-system configured to receive a transformer current signal from the current sensor and generate a trip signal based on a difference between the transformer current signal and a reference signal; and
   a pulse width modulator configured to generate a gate input signal for the active clamping circuit based at least in part on the trip signal.

2. The electronic system of claim 1, wherein the pulse width modulator is configured to generate the gate input signal having a pulse width based at least in part on the trip signal.

3. The electronic system of claim 1, wherein the power converter is a phase-shifted full-bridge peak current mode control power converter.

4. The electronic system of claim 1, further comprising additional pulse width modulators configured to control one or more primary transistors within the power converter.

5. The electronic system of claim 4, wherein the additional pulse width modulators are configured to receive the trip signal and to control the one or more primary transistors within the power converter based at least in part on the trip signal.

6. The electronic system of claim 1, wherein the current sensor comprises signal conditioning circuitry configured to generate the transformer current signal based on the current through the primary side of the transformer within the power converter.

7. The electronic system of claim 1, wherein the comparator sub-system comprises:

a digital-to-analog converter including a ramp input configured to provide the reference signal;

a comparator configured to receive the reference signal from the digital-to-analog converter and the transformer current signal from the current sensor, and to generate a comparator output signal based on a difference between the transformer current signal and a reference signal; and a filter and digital logic module configured to receive the comparator output signal from the comparator and generate the trip signal based on the comparator output signal.

8. The electronic system of claim 7, wherein the ramp input is configured to provide digital slope compensation to the digital-to-analog converter.

9. The electronic system of claim 1, wherein the active clamping circuit comprises:

a capacitor; and a transistor coupled in series with the capacitor across an output of a secondary bridge of the power converter, the transistor having a gate input configured to receive the gate input signal from the pulse width modulator.

10. A microcontroller unit for controlling a power converter having an active clamping circuit, comprising:

a comparator sub-system configured to receive a transformer current signal from a current sensor which represents current through a primary side of a transformer within the power converter and generate a trip signal based on a difference between the transformer current signal and a reference signal; and a pulse width modulator configured to generate a gate input signal for the active clamping circuit based at least in part on the trip signal.

11. The microcontroller unit of claim 10, wherein the pulse width modulator is configured to generate the gate input signal having a pulse width based at least in part on the trip signal.

12. The microcontroller unit of claim 10, wherein the power converter is a phase-shifted full-bridge peak current mode control power converter.

13. The microcontroller unit of claim 10, further comprising additional pulse width modulators configured to control one or more primary transistors within the power converter.

14. The microcontroller unit of claim 13, wherein the additional pulse width modulators are configured to receive the trip signal and to control the one or more primary transistors within the power converter based at least in part on the trip signal.

15. The microcontroller unit of claim 10, wherein the power converter includes a current sensor comprising signal conditioning circuitry configured to generate the transformer current signal based on the current through the primary side of the transformer within the power converter.

16. The microcontroller unit of claim 10, wherein the comparator sub-system comprises:

a digital-to-analog converter including a ramp input configured to provide the reference signal;

a comparator configured to receive the reference signal from the digital-to-analog converter and the transformer current signal from the current sensor, and to generate a comparator output signal based on a difference between the transformer current signal and a reference signal; and a filter and digital logic module configured to receive the comparator output signal from the comparator and generate the trip signal based on the comparator output signal.

17. The microcontroller unit of claim 16, wherein the ramp input is configured to provide digital slope compensation to the digital-to-analog converter.

18. The microcontroller unit of claim 10, wherein the active clamping circuit comprises:

a capacitor; and a transistor coupled in series with the capacitor across an output of a secondary bridge of the power converter, the transistor having a gate input configured to receive the gate input signal from the pulse width modulator.

19. A method for using a microcontroller unit to control a power converter having an active clamping circuit, the method comprising:

receiving a transformer current signal from a current sensor which represents current through a primary side of a transformer within the power converter;

generating a trip signal based on a difference between the transformer current signal and a reference signal; and generating a gate input signal for the active clamping circuit based at least in part on the trip signal.

20. The method of claim 19, wherein the power converter is a full-bridge power converter.

* * * * *